United States Patent Office 3,470,748
Patented Oct. 7, 1969

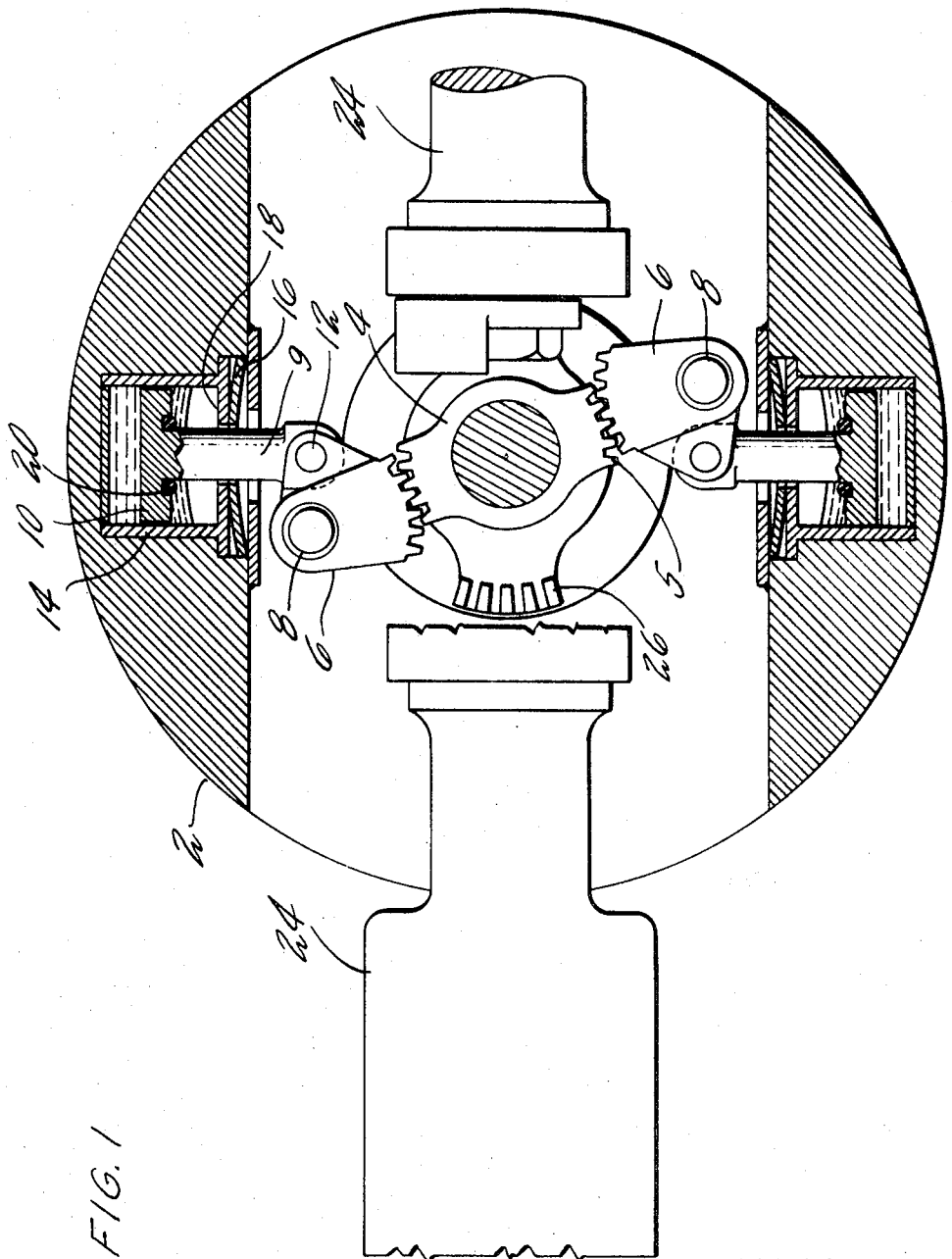

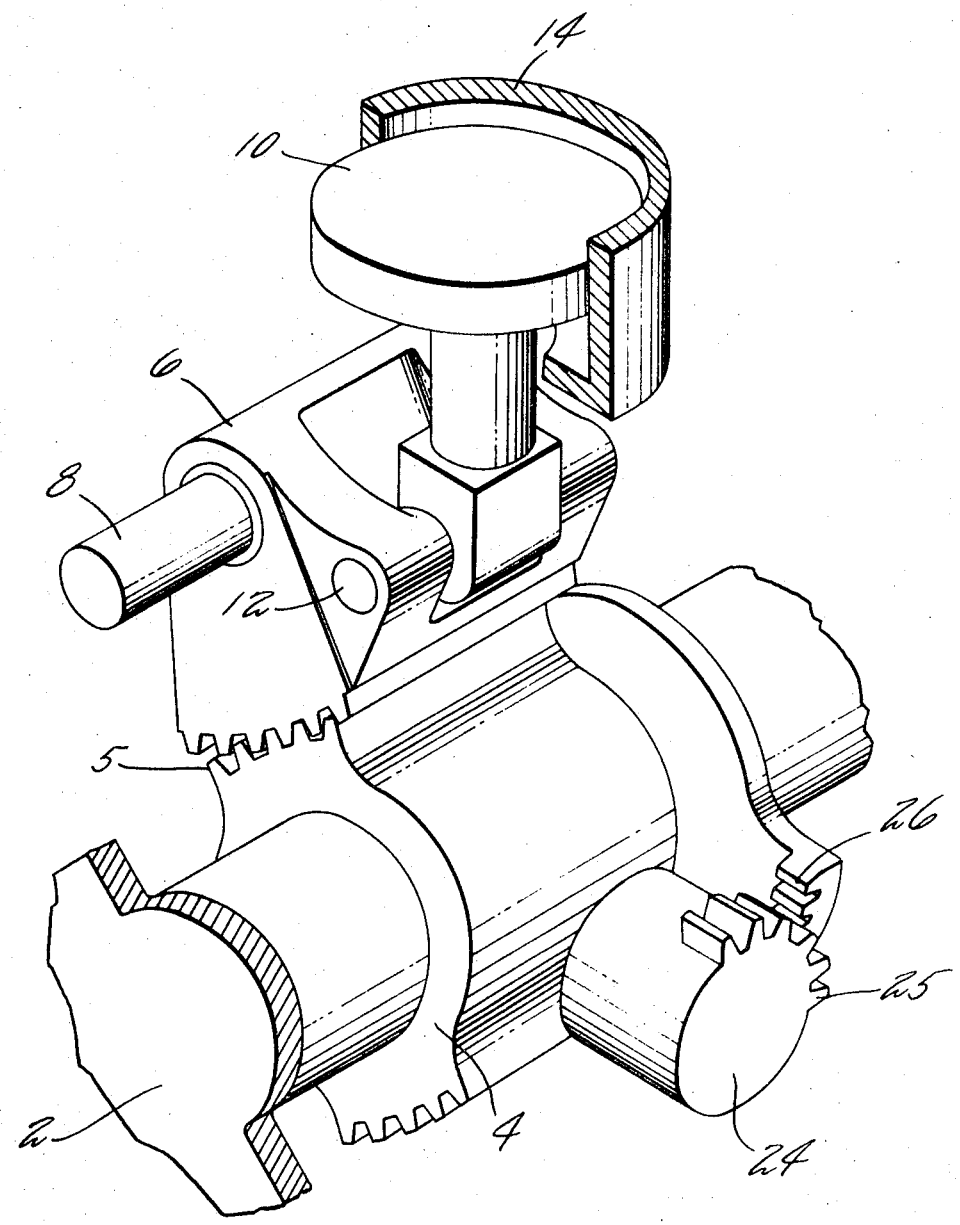

3,470,748
VIBRATION DAMPER
Philip E. Barnes, North Granby, Conn., and Edward H. Kusiak, Longmeadow, Mass., assignors to United Aircraft Corporation, East Hartford, Conn., a corporation of Delaware
Filed Feb. 21, 1967, Ser. No. 617,637
Int. Cl. G01p 3/26
U.S. Cl. 73—522    4 Claims

ABSTRACT OF THE DISCLOSURE

The cylinders of a dashpot type damper assembly are resiliently mounted on a radial line through the center of rotation of a spring-mass system. No moving seal is required between the piston and the cylinder because during rotation of the spring-mass system, centrifugal force holds the damping fluid radially outwardly away from the open end of the cylinder. As the rotational speed of the spring-mass system goes to rest, the piston is moved centrifugally inwardly by a spring force acting on the flyweight, at which time seal means disposed on the piston contact seal means disposed adjacent the open end of the cylinder and seals the damping fluid therein. The resilient mounting of the cylinders allows sealing of all pistons with their respective cylinders when the spring-mass system goes to rest.

BACKGROUND OF THE INVENTION

Field of the invention

This invention relates to vibration dampers and particularly to viscous dampers for rotating spring-mass systems.

Description of the prior art

It is well known in the art generally, to use damping to eliminate undesired vibrations in mechanical systems. It is desirable to use true viscous damping rather than dry friction damping because in a rotational speed governing system, for instance, friction damping would exert a steady-state frictional force on the governing system and, therefore, would introduce an error in governing speed. Viscous damping force, on the other hand, is a function of velocity and is, therefore, nonexistent during steady-state operation (since the relative velocity between the moving parts of the damper is zero during steady-state operation.) However, there exists a different problem with viscous damping in a rotating field, namely: a viscous damper contains a damping fluid which must be contained within the damper. In fluid viscous dampers known heretofore it has been necessary to provide a moving seal or bellows between the piston and cylinder of the damper in order to prevent leakage of the fluid during operation of the damper. Moving seals are undesirable because they are a source of friction and are, furthermore, subject to wear; and bellows are expensive and unreliable. These problems can be overcome by using a dry friction damper, but dry friction dampers are not desirable because of the aforementioned reason. The present invention provides true viscous damping for rotating spring-mass systems with no frictional damping and also prevents the damping fluid from leaking out of the viscous damper during either rotation or nonrotation of the spring-mass system without utilizing a moving seal or bellows between the piston and cylinder of the damper, thereby overcoming the problems heretofore encountered in the use of viscous dampers.

SUMMARY OF THE INVENTION

A primary object of the present invention is to provide true viscous damping for a rotating spring-mass system without any frictional damping.

A second object of the present invention is to prevent damping fluid from leaking out of a viscous damper during either rotation or nonrotation of a spring-mass system without utilizing a moving seal between the piston and cylinder of the damper.

In accordance with the present invention a true fluid viscous damper for a rotating spring-mass system, which does not require the use of moving seals, is provided by the combination of a piston slidably mounted within a damping cylinder, which cylinder is mounted on the rotating spring-mass system, open at its centrifugally inward end, and filled with damping fluid. During nonrotation of the spring-mass system, the open end of the cylinder is sealed by sealing means disposed on the piston which are in contact with sealing means disposed adjacent the open end of the cylinder. During rotation of the spring-mass system the fluid is prevented from leaking out of the cylinder by centrifugal force which holds the fluid centrifugally outward in the cyinder and away from the open end of the cylinder. In order to operate the damper, the piston is moved away from its sealed relationship with the cylinder and inwardly into the fluid contained within the cylinder initiating damping.

In accordance with the further aspect of the invention the piston is connected to moving means which move the piston away from its sealed relationship with the cylinder, and the damper, in turn, damps the movement of the moving means.

One embodiment, described for illustrative purposes only, might be as follows: A cylinder filled with damping fluid is mounted on a rotating spring-mass system. A piston slidably mounted within the cylinder is connected to flyweight means which are rotatably disposed on the rotating spring-mass system. Centrifugal force acting through the center of mass of the flyweight means will cause the flyweight means to move centrifugally outwardly against the force of a spring which, during nonrotation, holds the flyweight means in a predetermined position. Since the piston is connected to the flyweight means, as the flyweight means moves outwardly, the piston is likewise caused to translate outwardly, thus moving further into the damping cylinder and displacing some of the damping fluid from the centrifugally outward side of the piston to the centrifugally inward side of the piston and thereby initiating damping. No moving seal is required between the piston and the cylinder because when the spring-mass system is rotating, centrifugal force holds the damping fluid in the cylinder centrifugally outward and thus away from the open end of the cylinder. When the rotational speed of the spring-mass system decreases, the centrifugal force acting on the center mass of the flyweight means will decrease proportionately, and the flyweight means will move centrifugally inwardly because of the spring force applied to it, thereby moving the piston inwardly. In order to prevent the damping fluid from leaking out as the rotating spring-mass system approaches rest, a static seal is disposed on the piston so that as the piston moves to its farthest centifugally inward position, the seal disposed on the piston contacts seal means disposed adjacent the open end of the cylinder.

In further accord with the present invention, resilient means are disposed between the damping cylinders and the rotatable spring-mass system in the case where more than one damper is used so that if one of the pistons should seat before the other pistons, the respective cylinder of the first seating piston will continue to move against the force of the resilient means until the other pistons are seated against the seals disposed adjacent the open ends of their respective cylinders.

Thus it can be seen that a true viscous damper has been provided for a rotating spring-mass system in which the same force holding the damping fluid away from the open end of the damping cylinder can be used to move the piston away from its sealed relationship with the cylinder and into contact with the damping fluid in the cylinder, thereby providing damping. Furthermore, the moving means for moving the piston are, in turn, damped by the damper according to the present invention.

The foregoing and other objects, features and advantages of the present invention will become more apparent in light of the following detailed description of a preferred embodiment thereof as illustrated in the accompanying drawings.

DESCRIPTION OF THE DRAWING

FIG. 1 is a sectioned elevation of an air-driven turbine utilizing a damper in accordance with the present invention; and FIG. 2 is a partially broken away perspective view of a speed governing system for an air-driven turbine and the vibration damper in accordance with the present invention, showing in detail the cooperation of a flyweight, torsion bar and vibration damper piston.

DESCRIPTION OF THE PREFERRED EMBODIMENT

Referring now to FIGS. 1 and 2, the constant speed governing system of an air-driven turbine is shown as an example of a rotating spring-mass system having a rotatable hub 2 (FIG. 1) on which is coaxially mounted a torsion bar 4 which is fixed to rotatable hub 2 at one end and free at the other end. A first ring gear 5 is disposed around the torsion bar 4 for meshing with gear teeth on flyweight means 6 which are pivotally mounted to the rotatable hub 2 at pivot means 8. Piston rods 9 of damping pistons 10 are pivotally mounted at one end to the flyweight means 6 at damping piston pivots 12. The piston rods 9 are connected at their other ends to the damping pistons 10 which are also slidably mounted within the damping cylinders 14, which cylinders are slidably mounted radially outward of the damping pistons 10 on the rotatable hub 2, and are filled with damping fluid. Springs 16 are disposed between the damping cylinders 14 and the rotatable hub 2 for purposes hereinafter explained. Seal lands 18 (FIG. 1) are provided on the faces of the damping cylinder and walls for contacting static seals 20 (FIG. 1) which are circumferentially mounted on the piston rods 9 so that when the pistons are at their furthest radially inward position, the seals contact the sealing land 18 to prevent leakage of the damping fluid. Turbine blades 24 are provided with bevel gears 25 (FIG. 2) which engage a second ring gear 26 disposed about the torsion bar 4 for purposes hereinafter explained.

In operation, when the air-driven turbine is placed in a moving airstream, the air impinging on the turbine blades 24 causes the rotatable hub 2 to rotate. The purpose of the speed governing system is to maintain the air-driven turbine speed essentially constant. The speed of the air-driven turbine is maintained at this constant speed by constantly varying the pitch of the blades 24 over a range of air speed. The speed governing system of the air-driven turbine consists of flyweight means 6, the torsion bar 4, and the blades 24. If the airstream, into which the air-driven turbine is placed, causes the turbine to rotate at a speed different than the desired constant speed, the speed governing system adjusts the pitch of the blades so that the turbine maintains the desired constant speed. This is accomplished in the following manner: As the hub 2 rotates, the flyweight means 6 rotate outwardly due to the centrifugal force acting on their centers of mass. The gear teeth on flyweight means 6, which are in contact with the first ring gear 5 on torsion bar 4, cause the torsion bar to twist thereby applying a spring load to the torsion bar 4 which tends to resist the centrifugally outward motion of flyweight means 6. Flyweight means 6 continue to rotate outwardly until the resisting force of torsion bar 4 equals the centrifugal force acting on flyweight means 6. At this point, flyweight means 6 are in equilibrium and they will cease to rotate, and the blades 24 cease moving. If the speed of the air-driven turbine increases to a value greater than the desired constant speed, the flyweight means 6 will move centrifugally outward twisting torsion bar 4 further; the gear teeth on the second ring gear 26 on the torsion bar 4 which are in contact with bevel gears 25 on the blades 24 rotate the blades about their longitudinal axes and thereby adjust the pitch of the blades. Conversely, if the airstream impinging on blades 24 causes the air-driven turbine to rotate below the constant speed at some particular blade pitch setting, the torsion bar 4 will rotate in the opposite direction because the centrifugal force on flyweight means 6 is now proportionately decreased in accord with the lower relative speed of the airstream contacting the blades 24 and, therefore, will change the pitch of the blades 24 in the opposite direction so that once again the blades will be correctly pitched to maintain the desired speed of the turbine.

The present invention is concerned with damping the vibrations occurring between the torsion bar 4 and flyweight means 6 and is directed to that end. As the flyweight means 6 rotate centrifugally outwardly and inwardly due to the varying speeds of the airstream contacting the blades, the damping pistons 10 translate inwardly and outwardly displacing damping fluid from one side of the piston to the other thereby damping the vibrations. In the case where more than one damper is povided, there is a problem due to the tolerances of the mechanical parts in that the seal 20 on one piston rod 9 may tend to seat against the seal land 18 of its respective damping cylinder before the other pistons do. This is undesirable because if one piston is allowed to seat first, it will prevent further rotation of the flyweight and, therefore, of the torsion bar 4, and thus one piston cylinder arrangement will not be sealed and the damping fluid is able to leak out of the unsealed cylinder. In order to obviate this problem, spring 16, which is disposed between the end wall of cylinder 14 and the rotatable hub 2, is provided. If the seal 20 on one of the damping pistons 10 should, because of the tolerances in this system, seat against its respective seal land 18 before the other piston does, the spring will allow the damping cylinder 14 to move inwardly until the opposing piston seats against its seal land.

There has thus been described a preferred embodiment of a vibration damper for a spring-mass system in accordance with the present invention. While the speed governor system of an air-driven turbine has been shown as an example of a rotating spring-mass system upon which the present invention may be utilized, it will be obvious to anyone skilled in the art that any similiar spring-mass system will be benefited by the teachings of the present invention. Therefore it should be understood by those skilled in the art that various changes and omissions in form and detail thereof may be made therein without departing from the spirit and scope of the invention which is to be limited only as set forth in the following claims.

What we claim as new and desire to secure by Letters Patent of the United States is:

1. A viscous damper assembly for a rotatable body, which comprises:
  a plurality of cylinders, each containing fluid, disposed on the rotatable body and having a closed end and an open end, said cylinders being oriented so that the fluid contained therein will be forced against the closed ends thereof as a result of centrifugal force as said cylinders revolve in response to the rotation of the body;

first seal means disposed near the open end of each said cylinder;

a plurality of pistons, each slidably mounted within its respective cylinder, said pistons having second seal means disposed thereon, said second seal means cooperating with said first seal means to seal the open ends of said cylinders to prevent fluid from passing therethrough when said pistons are adjacent the open ends thereof;

moving means responsive to the rotation of the body, cooperating with said pistons to move said pistons outwardly within said cylinders away from the open ends of said cylinders during rotation of the body, said pistons, in conjunction with the fluid in said cylinders, in turn damping the movement of said moving means, said moving means causing said pistons to move into sealed relationship with the open ends of said cylinders in the absence of rotation;

interconnecting means disposed on the rotatable body for interconnecting said moving means and thereby said pistons so that said moving means and said pistons are caused to operate substantially in unison; and wherein said cylinders are each disposed on the rotatable body by resilient means whereby each of said cylinders is permitted to move centrifugally inwardly against a corresponding one of said resilient means until each of said pistons is in sealed relationship with the open end of its respective cylinder as the rotatable body goes to rest.

2. A viscous damper assembly for a rotatable body, which comprises:

a plurality of cylinders each containing fluid and resiliently disposed on the rotatable body and having a closed end and an open end, said cylinders being oriented so that the fluid contained therein will be forced against the closed ends thereof as a result of centrifugal force as said cylinders revolve with the rotatable body;

first seal means disposed near the open end of each of said cylinders;

a plurality of pistons, each being slidably mounted within its respective cylinder, said pistons having second seal means disposed thereon, said second seal means cooperating with said first seal means to seal the open end of said cylinders to prevent fluid from passing therethrough when said pistons are adjacent the open ends thereof in response to the rotatable body being at rest;

flyweight means responsive to the rotation of the body, cooperating with said pistons to move said pistons radially outwardly within said cylinders away from the open ends of said cyinders during rotation of the body, said pistons and said fluid cooperating to damp the movement of said flyweight means, said flyweight means causing said pistons to move radially inwardly into sealed relationship with the open ends of said cylinders in the absence of rotation; and means disposed on the rotatable body for interconnecting said flyweight means so that said flyweight means are caused to operate substantially in unison thereby causing said pistons to operate substantially in unison; said resiliently disposed cylinders allowing said interconnecting means to move until all of said pistons are in sealed relationship with their respective cylinders in the absence of rotation of the body.

3. A viscous damper assembly for a rotatable body, comprising:

a plurality of cylinders resiliently disposed on the rotatable body so that said cylinders are movable radially inwardly and outwardly, each of said cylinders containing fluid and having a closed end and an open end, said cylinders being oriented so that the fluid contained therein will be forced against the closed ends theerof as a result of centrifugal force as said cylinders revolve in response to rotation of the body;

first seal means disposed near the open ends of each of said cylinders;

a plurality of pistons slidably mounted within their respective cylinders, said pistons having second seal means disposed thereon for cooperating with said first seal means to seal the open ends of said cylinders to prevent fluid from passing therethrough when said pistons are adjacent the open ends thereof; and moving means responsive to rotation of the body operatively connected to said pistons to move said pistons radially outwardly within said cylinders substantially in unison in response to rotation of the body, said pistons and said fluid damping the movement of said moving means, said moving means causing said pistons to move radially inwardly within said cylinders into sealed relationship with the open ends of said cylinders substantially in unison in response to the body coming to rest whereby said resiliently mounted cylinders allow said moving means to move, thereby allowing said pistons to move until all of said pistons are in sealed relationship with their respective cylinders.

4. A viscous damper assembly for a rotatable body, comprising:

a plurality of cylinders including means for resiliently disposing said cylinders on the rotatable body, each cylinder containing fluid and having a closed end and an open end, said cylinders being oriented so that the fluid contained therein will be forced against the closed ends thereof as a result of centrifugal force as said cylinders revolve with the rotatable body;

first seal means disposed near the open ends of said cylinders;

a plurality of pistons, each being slidably disposed within its respective cylinder, said pistons having second seal means disposed thereon for cooperation with said first seal means to seal the open ends of said cylinders to prevent fluid from passing therethrough when said pistons are adjacent the open ends thereof; and moving means responsive to rotation of the body operatively connected to said pistons to move said pistons radially outwardly within said cylinders substantially in unison in response to rotation of the body, said pistons and said fluid damping the movement of said moving means, said moving means causing said pistons to move radially inwardly within said cylinders into sealed relationship with the open ends of said cylinders substantially in unison in response to the body coming to rest whereby when one of said pistons seats before the other said pistons, the respective cylinder of the first seating piston is allowed to move against the force of the resilient means until the other of said pistons are seated and sealed with their respective cylinders.

References Cited

UNITED STATES PATENTS

| 666,237 | 1/1901 | Riotte | 73—522 |
| 677,064 | 6/1901 | Cooke | 73—522 |

JAMES J. GILL, Primary Examiner